(12) United States Patent
Hiraoka

(10) Patent No.: US 8,926,082 B2
(45) Date of Patent: Jan. 6, 2015

(54) OPTICALLY POLYMERIZABLE INK JET INK, INK CARTRIDGE, AND PRINTER

(75) Inventor: Takao Hiraoka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 254 days.

(21) Appl. No.: 13/442,958

(22) Filed: Apr. 10, 2012

(65) Prior Publication Data

US 2012/0293589 A1 Nov. 22, 2012

(30) Foreign Application Priority Data

May 16, 2011 (JP) ................................. 2011-109748

(51) Int. Cl.
| | | |
|---|---|---|
| B41J 2/175 | (2006.01) | |
| B41J 2/21 | (2006.01) | |
| C09D 11/30 | (2014.01) | |
| C09D 11/101 | (2014.01) | |

(52) U.S. Cl.
CPC ............ C09D 11/101 (2013.01); B41J 2/17513 (2013.01); B41J 2/2107 (2013.01); C09D 11/30 (2013.01); B41J 2/17553 (2013.01)
USPC ................ 347/100; 347/86; 347/95; 347/102

(58) Field of Classification Search
CPC .......... B41J 2/01; B41J 2/2107; B41J 11/002; B41J 11/0015; C09D 11/00; C09D 11/30; C09D 11/101
USPC .............. 347/95–100, 102, 86; 523/160, 161; 106/31.13, 31.27, 31.6, 31.29, 31.61, 106/31.62
See application file for complete search history.

(56) References Cited

U.S. PATENT DOCUMENTS

2008/0024577 A1 1/2008 Nakano et al.
2009/0118388 A1* 5/2009 Naruse et al. ................... 522/39

FOREIGN PATENT DOCUMENTS

| JP | 11-256085 | 9/1999 |
|---|---|---|
| JP | 2006-28518 | 2/2006 |
| JP | 2006-169418 | 6/2006 |
| JP | 2007-237405 | 9/2007 |
| JP | 2007-314744 | 12/2007 |
| JP | 2008-174713 | 7/2008 |
| JP | 2008-533217 | 8/2008 |
| JP | 2011-502191 | 1/2011 |
| WO | WO2006/079415 A1 | 8/2006 |
| WO | WO2007/100008 A1 | 9/2007 |
| WO | WO2009/054621 A2 | 4/2009 |

OTHER PUBLICATIONS

U.S. Appl. No. 13/243,676, filed Sep. 23, 2011.

* cited by examiner

*Primary Examiner* — Matthew Luu
*Assistant Examiner* — Rut Patel
(74) *Attorney, Agent, or Firm* — Cooper & Dunham LLP

(57) ABSTRACT

An optically polymerizable inkjet ink including an optically polymerizable monomer having a Stimulation Index (SI) of less than 3 in a skin sensitization test as measured by Local Lymph Node Assay (LLNA), a molecule cleavage type optical polymerization initiator, a hydrogen-extracting type optical polymerization initiator, and an amine compound serving as a polymerization accelerator.

7 Claims, 1 Drawing Sheet

OPTICALLY POLYMERIZABLE INK JET INK, INK CARTRIDGE, AND PRINTER

CROSS-REFERENCE TO RELATED APPLICATION

This patent application is based on and claims priority pursuant to 35 U.S.C. §119 to Japanese Patent Application No. 2011-109748, filed on May 16, 2011, the entire disclosure of which is hereby incorporated by reference herein.

BACKGROUND OF THE INVENTION

1. Field of the Invention

The present invention relates to optical polymerizable inkjet ink, an ink cartridge that accommodates the ink, and a printer in which the ink cartridge is installed.

2. Description of the Background Art

Typically, (meth)acrylic acid ester compounds, acrylamide compounds, oxetane compounds, and epoxy compounds are used as optical polymerizable monomers for use in optical polymerizable inkjet ink. Among these, (meth)acrylate compounds and acrylamides are preferable because these are widely available in significant quantities at low cost and can be used in combination with widely used, inexpensive radical polymerization-type optical polymerization initiators. However, most (meth)acrylic acid ester compounds and acrylamide compounds are toxic, and although some of them have relatively weak oral toxicity and dermal irritancy, the compounds having a low viscosity for use in inkjet ink can provoke an allergic response following contact with the skin.

In an attempt to find solutions to the problem of skin sensitization, several (meth)acrylic acid ester compounds and acrylamide compounds have been found that are suitable for use as optical monomers insofar as they have a Stimulation Index (SI) of less than 3 as measured by the Local Lymph Node Assay (LLNA) method. However, inkjet ink in which such compounds are blended to provide a curing property sufficient for practical use has a relatively high viscosity in comparison with typical optical polymerizable inkjet ink. Therefore, for example, if a desirable high image density is to be obtained by increasing the blend ratio of a pigment, such inkjet ink requires an extra decrease in the viscosity to achieve stable ejection.

In the optical polymerizable inkjet ink, a combinational use of a hydrogen-extracting type optical polymerization initiator such as a thioxanthone-based compound and a polymerization accelerator such as an amine compound is widely known, as described, for example, in Japanese Patent Applications Publications Nos. JP-H11-256085-A and JP-2006-28518-A. However, when these combinational uses are applied to polymerization of an optically polymerizable monomer having an SI of less than 3, the curing property of the inkjet ink is not satisfactorily improved.

It is possible to decrease the viscosity of the optical polymerizable inkjet ink by blending in an organic solvent, but such an organic solvent is volatile so that the viscosity of the ink increases, thereby degrading the stability of ink ejection. Moreover, such volatile organic compounds (VOCs) are emitted into the air, which causes an environment problem. Therefore, it is preferable to avoid using such VOCs.

SUMMARY OF THE INVENTION

In view of the foregoing, the present invention provides an optically polymerizable inkjet ink including an optically polymerizable monomer having a Stimulation Index (SI) of less than 3 in a skin sensitization test as measured by Local Lymph Node Assay (LLNA), a molecule cleavage type optical polymerization initiator, a hydrogen-extracting type optical polymerization initiator, and an amine compound serving as a polymerization accelerator.

As another aspect of the present invention, an ink cartridge including a bag to accommodate the optically polymerizable inkjet ink mentioned above, and a cartridge case containing the bag.

As another aspect of the present invention, a printer including a printing unit, and the ink cartridge mentioned above.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings, in which like reference characters designate like corresponding parts throughout and wherein.

DETAILED DESCRIPTION OF THE INVENTION

Figure 1:
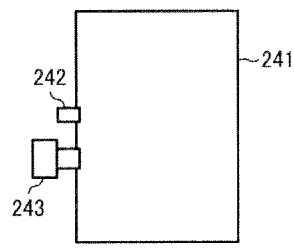
FIG. 1 is a schematic diagram illustrating an example of an ink bag of an ink cartridge according to the present disclosure.

The present disclosure will be described below in detail with reference to several embodiments and accompanying drawings.

The present inventors have found that, when optically polymerizable inkjet ink containing an optically polymerizable monomer which is safe as far as the skin sensitization because it has an Stimulation Index (SI) of less than 3 according to the Local Lymph Node Assay (LLNA) method is used in combination with a molecule cleavage type optical polymerization initiator, a hydrogen-extracting type optical polymerization initiator, and an amine compound serving as a polymerization accelerator, the viscosity of the ink decreases and the curability thereof improves.

In addition, as described in Examples, when insufficient curing occurs due to shortage of irradiation of light, the film tends to be clouded, resulting in loss of gloss. That is, such curing deficiency can be found by the naked eye instead of finger touching, which is advantageous in terms of detecting defective products while producing images.

The Local Lymph Node Assay (LLNA) method is a skin sensitization test defined as OECD Test Guideline 429 and as described in documents such as an issue of September 2005, Vol. 25, No. 9, p 55, published by CMC Publishing Co., Ltd., when a compound has a Stimulation Index (SI) of less than 3, which is an indicator of the degree of skin irritation, the compound is determined to have no problem with regard to the skin sensitization.

In addition, any compound evaluated as "none" or "negative" for skin sensitization in the Material Safety Data Sheet (MSDS) naturally satisfies the SL criterion mentioned above and is contained in the present disclosure.

Specific examples of the optical polymerizable monomer easily available in the market with a low cost and free from skin sensitization problems include, but are not limited to, a polyethylene glycol dimethacrylate represented by Chemical formula 1 below, γ-butyrolactone methacrylate, trimethylol propane trimethacrylate, tricyclodecane dimethanol dimethacrylate, caprolacone-modified dipentaerythritol hexaacrylate, polypropylene glycol diacrylate ($CH_2=CH-CO-(OC_3H_6)n-OCOCH=CH2(n\approx1.2)$)], caprolactone-modified hydroxy pivalic acid neopentyl glycol diacrylate, polyethoxilated tetramethylol methane tetraacrylate, ethylene oxide-modified bisphenol A diacrylate, neopentyl glycol dimethacrylate, stearyl acrylate, 1,4-butane diol dimethacrylate, and hydroxyethyl acrylamide:

Chemical formula 1

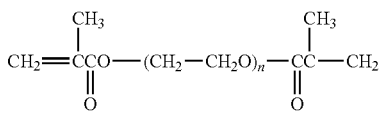

where n is an integer of from 9 to 14.

In addition, although slightly having a problem with regard to the skin sensitization as a product itself, the following (meth)acrylate (meth)acryl amides can be used in combination unless causing problems as ink.

Specific examples thereof include, but are not limited to, ethylene glycol (meth)acrylate, hydroxy pivalic acid neopentyl glycol di(meth)acrylate, γ-butylolactone acrylate, isobornyl (meth)acrylate, formalized trimethylol propane mono(meth)acrylate, polytetramethylene glycol di(meth)acrylate, trimethylol propane (meth)acrylic acid salicylic acid ester, diethylene glycol di(meth)acrylate, triethylene glycol di(meth)acrylate, tetraethylene glycol di(meth)acrylate, polyethylene glycol diacrylate [($CH_2=CH-CO-(OC_2H_4)n-OCOCH=CH_2(n\approx4)$)], polyethylene glycol diacrylate [($CH_2=CH-CO-(OC_2H_4)n-OCOCH=CH_2(n\approx9)$)], polyethylene glycol diacrylate [($CH_2=CH-CO-(OC_2H_4)n-OCOCH=CH_2(n\approx14)$)], polyethylene glycol diacrylate [($CH_2=CH-CO-(OC_2H_4)n-OCOCH=CH_2(n\approx23)$)], dipropylene glycol di(meth)acrylate, tripropylene glycol di(meth)acrylate, polypropylene glycol dimethacrylate [($CH_2=C(CH_3)-CO-(OC_3H_6)n-OCOC(CH_3)=CH_2(n\approx7)$)], 1,3-butane diol di(meth)acrylate, 1,4-butane diol diacrylate, 1,6-hexane diol di(meth)acrylate, 1,9-nonene diol di(meth)acrylate, neopentyl glycol di(meth)acrylate, tricyclodecane dimethanol diacrylate, di(meth)acrylate of an adduct of bisphenol A with propylene oxide, 1,6-hexane dioldi(meth)acrylate, polyethylene glycol di(meth)acrylate, dipenta erythritol hexa(meth)acrylate, methacryloyl morphorine, 2-hydroxyethyl methacryl amide, ethylene oxide-modified tetramethylol methane tetramethacrylate, dipentaerythritol hydroxypenta(meth)acrylate, caprolactone-modified dipentaerythritol hydroxy penta(meth)acrylate, ditrimethylol propane tetra(meth)acrylate, pentaerythritol tetra(meth)acrylate, trimethylol propane triacrylate, ethylene oxide-modified trimethylol propane tri(meth)acrylate, propylene oxide-modified trimethylol propane tri(meth)acrylate, caprolactone-modified trimethylol propane tri(meth)acrylate, pentaetythritol tri(meth)acrylate, tris(2-hydroxyethyl) isocyanulate tri(meth)acrylate, neopentyl glycol diacrylate, ethoxylated neopentyl glycol di(meth)acrylate, propoxylated neopentyl glycol di(meth)acrylate, propoxylated glyceryl tri(meth)acrylate, polyester di(meth)acrylate, polyester tri(meth)acrylate, polyester tetra(meth)acrylate, polyeter penta (meth)acrylate, polyester poly(meth)acrylate, vinylcaprolactam, vinyl pyrrolidone, N-vinyl formamide, polyurethane di(meth)acrylate, polyurethanetri(meth)acrylate, polyurethane tetra(meth)acrylate, polyurethane penta (meth)acrylate, and polyurethane hexa(meth)acrylate.

As the optical polymerization initiator to polymerize the optically polymerizable monomer, the molecule cleavage type optical polymerization initiator and the hydrogen-extracting type optical polymerization initiator are used in combination.

Specific examples of the molecule cleavage type optical polymerization initiators include, but are not limited to, 2,2-dimethoxy-1,2-diphenyl ethane-1-one, 1-hydroxycyclohexyl phenyl ketone, 2-hydroxy-2-methyl-1-phenylpropane-1-one, 1-[4-(2-hydroxyethoxy)phenyl]-2-hydroxy-2-methyl-1-propane-1-one, 2-hydroxy-1-{4-[4-(2-hydroxy-2-methylpropionyl)benzil]phenyl}-2-methyl-1-propane-1-one, phenylglyoxic acid methyl ester, 2-methyl-1-[4-(methylthio)phenyl]-2-morpholino propane-1-one, 2-benzil-2-dimethylamino-1-(4-morpholinophenyl)butanone-1,2-dimethylamino-2-(4-methylbenzil)-1-(4-morpholine-4-yl-phenyl)butane-1-on, bis(2,4,6-trimethyl benzoyl)phenyl phosphine oxide, bis(2,6-dimethoxybenzoyl)-2,4,4-trimethyl-pentylphosphine oxide, 2,4,6-trimethylbenzoyl phosphine oxide, 1,2-octane dion-[4-(phenylthio)-2-(o-benzoyloxime)], ethanone-1-[9-ethyl-6-(2-methylbenzoyl)-9H-carbazole-3-yl]-1-(O-acetyloxime), and [4-(methylphenylthio)phenyl]phenyl methanone. These can be used alone or in combination. Among these, 2-dimethylamino-2-(4-methylbenzil)-1-(4-morpholine-4-yl -phenyl)butane-1-one is preferable because of its curability and 2-methyl-1-[4-(methylthio)phenyl]-2-morpholino propane-1-one is preferable because it is inexpensive.

Specific examples of the hydrogen-extracting type optical polymerization initiator include, but are not limited to, thioxanthone-based compounds such as 2,4-diethylthioxanthone, 2-chlorothioxanthone, isopropylthioxanthone, and 1-chloro-4-propylthio xanthone and benzophenone-based compounds such as benzophenone, methylbenzophenone, methyl-2-benzoylbeozoate, 4-benzoyl-4'-methyldiphenyl sulfide, and phenylbenzophenone.

Considering the current increasing concern for the environment, LED light sources draw attentions as a light source for curing optically polymerizable ink because LED light sources have a better energy efficiency resulting in more energy-saving than typical light sources such as a mercury lamp and a metal halide lamp. LED light sources free from practical problems emits light having a wavelength of 365 nm or higher. Therefore, when a current LED light source is used, it is difficult to obtain sufficient polymerization initiating effect by using benzophenone-based compounds judging from the absorption spectra unique to each material. Therefore, thioxantohone-based compounds are preferable and among these, chlorine-free compounds such as 2,4-diethylthioxanthone and isopropylthio xanthone are preferable considering the concern for the environment but the initiators are not limited thereto.

Amine compounds can be suitably used as the polymerization accelerator. Preferred specific examples of the amine compounds include, but are not limited to, salicylic acid ester compounds having an N,N-dimethyl amino group such as p-dimethylamino ethylsalicylate, p-dimethylamino salicylic acid-2-ethylhexyl, p-dimethylamino methylsalicylate, salicylic acid-2-dimethylaminoethyl, and p-dimethylamino salicylic acid buthoxyethyl. Among these, p-dimethylamino ethylsalicylate is preferable in terms of availability, cost, and viscosity reducing effect.

Such amine compounds are hydrogen supplying sources for the hydrogen-extracting type optical polymerization initiator. Among these, salicylic acid ester compounds having an N,N-dimethyl amino group are suitably used to promote the curing reaction efficiently.

Known inorganic pigments and organic pigments can be used as the coloring agents for the ink.

Carbon black manufactured by a furnace method or a channel method is used as the black pigments.

Specific examples of the yellow pigments include, but are not limited to, Pig. Yellow pigments such as Pigment Yellow 1, Pigment Yellow 2, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 75, Pigment Yellow 83, Pigment Yellow 93, Pigment Yellow 95, Pigment Yellow 97, Pigment Yellow 98, Pigment Yellow 114, Pigment Yellow 120, Pigment Yellow 128, Pigment Yellow 129, Pigment Yellow 138, Pigment Yellow 150, Pigment Yellow 151, Pigment Yellow 154, Pigment Yellow 155, and Pigment Yellow 180.

Specific examples of the magenta pigments include, but are not limited to, Pig. Red pigments such as Pigment Red 5, Pigment Red 7, Pigment Red 12, Pigment Red 48 (Ca), Pigment Red 48 (Mn), Pigment Red 57 (Ca), Pigment Red 57:1, Pigment Red 112, Pigment Red 122, Pigment Red 123, Pigment Red 168, Pigment Red 184, Pigment Red 202, and Pigment Violet 19.

Specific examples of the cyan pigments include, but are not limited to, Pig. Blue pigments such as Pigment Blue 1, Pigment Blue 2, Pigment Blue 3, Pigment Blue 15, Pigment Blue 15:3, Pigment Blue 15:4, Pigment Blue 16, Pigment Blue 16, Pigment Blue 22, Pigment Blue 60, Pat Blue 4, and Pat Blue 60.

Specific examples of the white pigments include, but are not limited to, sulfates of alkali earth metals such as barium sulfide, carbonates of alkali earth metals such as calcium carbonates, silicas such as fine powder of silicic acid and synthetic silicate, calcium silicate, alumina, hydrated alumina, titanium oxide, zinc oxide, talc, and clay.

Considering the properties, other inorganic pigments and organic pigments can be suitably used.

Optionally, polymerization inhibitors such as 4-methoxy-1-naphthol, methoquinone, 2,2'-dihydroxy-3,3'-di(a-methylcyclohexyl)-5,5'-dimethyldiphenyl methane, p-benzoquinone, di-t-butyldiphenyl amine, 9,10-di-n-buthoxyamthracene, and 4,4'-[1,10-dioxo-1,10-decanediylbis(oxy)]bis[2,2,6,6-tetramethyl]-1-piperidinyloxy, surface active agents having higher aliphatic acids, silicone, or fluorine, and polar group containing polymer pigment dispersants can be used.

The ink of the present disclosure is accommodated in a container, which can be used as an ink cartridge. During operations such as changing ink, there is no need to directly touch the ink, which makes users free from concerns of contamination of fingers and clothes and prevents foreign objects such as dust from mingling with the ink.

There is no specific limitation as to the container. Any form, any structure, any size, and any material can be suitably selected. For example, a container having a (collapsible) ink bag formed of aluminum laminate film, a resin film, etc. is preferable.

Figure 2:
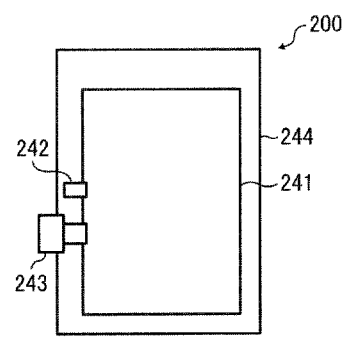
FIG. 2 is a schematic diagram illustrating an example of the ink cartridge that contains the ink bag.

The ink cartridge is described with reference to FIGS. 1 and 2. FIG. 1 is a schematic diagram illustrating an example of an ink bag 241 of an ink cartridge and FIG. 2 is a schematic diagram illustrating an ink cartridge 200 that accommodates the ink bag 241 of FIG. 1 in a cartridge case 244.

As illustrated in FIG. 1, after the ink bag 241 is filled with ink from an ink inlet 242 and the air in the ink bag 241 is discharged, the ink inlet 242 is closed by fusion. When in use, a needle of the inkjet recording apparatus is pierced into an ink outlet 243 formed of rubber to supply ink to the apparatus. The ink bag 241 is formed of a packing material such an aluminum laminate film having no air permeability. As illustrated in FIG. 2, the ink bag 241 is accommodated in the cartridge case 244 made of plastic and the ink cartridge 200 is attached to the inkjet recording apparatus.

The ink cartridge of the present disclosure is preferably detachably attachable to the inkjet recording apparatus. By using the ink cartridge, replenishing and exchanging ink is simplified, thereby improving the workability.

Figure 3:
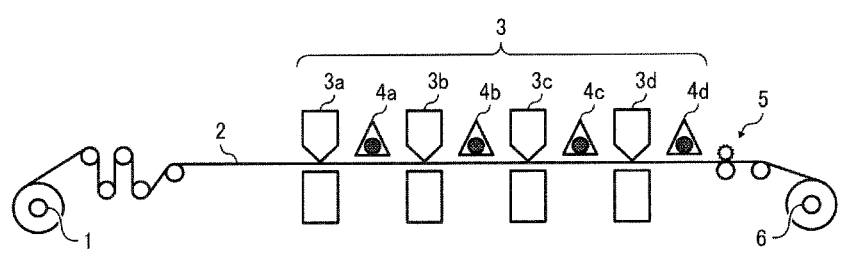
FIG. 3 is a schematic diagram illustrating an example of an inkjet recording apparatus (printer) according to the present disclosure

FIG. 3 is a schematic diagram illustrating an example of the inkjet recording apparatus (printer) as described above.

FIG. 3 is a diagram illustrating an example in which color images are formed by a printing unit 3 (3a, 3b, 3c, and 3d of each color, for example, yellow, magenta, cyan, and black) from which each color ink is ejected on a recording medium 2 followed by irradiation of UV from ultraviolet light sources (light sources for curing) 4a, 4b, 4c, and 4d for each print. The recording medium 2 is supplied from left to right in FIG. 3 from a recording medium supplying roll 1.

The recording medium 2 is typically paper, film, metal, or any combination thereof. In addition, although the recording medium 2 has a roll form in FIG. 3, a sheet form is also suitable. In the case of a sheet form, images are formed as illustrated in FIG. 3 by providing a base such as a belt conveyor to convey the recording medium 2 having a sheet form. Also, duplex mode is possible.

Although the ink is stably and highly cured if the color image is irradiated with ultraviolet each time it is printed, it is possible to save energy and cost by, for example, curing the images by the light source 4D after all the multiple color images are printed while reducing or omitting irradiation of ultraviolet by the light sources 4a, 4b, and 4c. "5" in FIG. 3 is a processing unit and "6" represents a roller to reel the recording medium 2.

Having generally described (preferred embodiments of) this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Examples 1 to 56 and Comparative Examples 1 to 56

Mix materials (A) to (D) with the blending ratios (parts by weight) shown in Tables 1 to 4 to obtain ink of Examples 1 to 56. Mix materials (A) and (B) or (A), (C), and (D) with the blending ratios (parts by weight) shown in Tables 5 to 8 to obtain ink of Comparative Examples 1 to 56.

While the ink In Examples is prepared by combinations of the polymerization initiators (B) and (C), the ink In Comparative Examples is prepared by using the polymerization initiator (B) or (C).

(A): Optical polymerizable monomer {(meth)acrylic acid ester compound and acrylamide compound negative or SI value of less than 3 in the skin sensitization test}

(B): Molecule cleavage type optical polymerization initiator (C): Hydrogen-extracting type optical polymerization initiator (D): Polymerization accelerator The details of A1 to A14, B1 and B2, C1 and C2, and D1 in Tables 1 to 8 are as follows: The value in the parentheses at the end of A1 to A14 is an SI value. "negative" or "none" means evaluation of skin sensitization as "negative" or "none" in the MSDS sheet in which the SI value is naturally less than 3.

A1: Neopentyl glycol dimethacrylate (2.0)
A2: Polyethylene glycol dimethacrylate represented by the Chemical formula 1 (n≈9) (1.3)
A3: Polyethylene glycol methacrylate represented by the Chemical formula 1 (n≈14) (1.6)
A4: γ-butylo lactone methacrylate (2.1)
A5: Trimethylol propane trimethacrylate (1.9)
A6: Tricyclodecane dimethanol dimethacrylate (1.3)
A7: Caprolactone-modified dipentaerythritol hexaacrylate (negative)
A8: Caprolactone-modified hydroxy pivalic acid neopentyl glycol diacrylate (0.9)
A9: Polyethoxilated tetramethylol methane tetraacrylate (1.7)
A10: Ethylene oxide-modified bisphenol A diacrylate (1.2)
A11: Hydroxyethyl acrylamide (None)
A12: Stearyl acrylate (2.7)
A13: 1,4-butane diol dimethacrylate (2.6)
A14: Polypropylene glycol diacrylate ($CH_2$=CH—CO—($OC_3H_6$)n-OCOCH=$CH_2$(n≈1.2)] (1.5)
B1: 2-dimethylamino-2-(4-methylbenzil)-1-(4-morpholine-4-yl-phenyl)butane-1-on
B2: 2-methyl-1-[4-(methylthio)phenyl]-2-morpholino propane-1-on
C1: 2,4-diethylthioxanthone
C2: Isopropylthioxanthone
D1: p-dimethylamino ethyl salicitate With regard to each ink, the viscosity at 60° C. (mPa·S) and the amount of light (mJ/cm2) required for curing are measured.

The viscosity at 60° C. (mPa·S) of each ink is measured by a cone blade type rotation viscometer (manufactured by Toki Sangyo Co., Ltd.) while the temperature of homothermic circulating water is set to be 60° C.

The temperature of 60° C. is determined considering the specification of the inkjet ejecting head such as GEN4 (manufactured by Ricoh Printing Systems Ltd.) which can be heated and available in the market.

The amount of light required for curing is recorded when the applied film manually formed on a PET film available in the market to have a thickness of about 9 micro meter is determined to be not sticky by finger touching while changing the amount of irradiation from 5,000 to 1,000, 500, 200, and 100 (mJ/cm$^2$) in a stepwise manner by using a UV irradiator (LH6, manufactured by Fusion Systems Co., Ltd.).

In addition, the appearance of the cured films and the uncured films is checked by the naked eye.

The results are shown in Tables 1 to 8.

TABLE 1

| | | Examples | | | | | | | | | | | | | |
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 |
| A | A1 | | | 5 | | | | | | | | | | | |
| | A2 | | 5 | | | | | | | | | | | | |
| | A3 | | | | 5 | | | | | | | | | | |
| | A4 | | | | | 5 | | | | | | | | | |
| | A5 | 100 | 95 | 95 | 95 | 95 | 95 | 95 | 95 | 95 | 95 | 95 | 95 | 95 | 95 |
| | A6 | | | | | | 5 | | | | | | | | |
| | A7 | | | | | | | 5 | | | | | | | |
| | A8 | | | | | | | | 5 | | | | | | |
| | A9 | | | | | | | | | 5 | | | | | |
| | A10 | | | | | | | | | | 5 | | | | |
| | A11 | | | | | | | | | | | 5 | | | |
| | A12 | | | | | | | | | | | | 5 | | |
| | A13 | | | | | | | | | | | | | 5 | |
| | A14 | | | | | | | | | | | | | | 5 |
| B | B1 | 15 | 15 | 15 | 15 | 15 | 15 | 15 | 15 | 15 | 15 | 15 | 15 | 15 | 15 |
| C | C1 | 10 | 10 | 10 | 10 | 10 | 10 | 10 | 10 | 10 | 10 | 10 | 10 | 10 | 10 |
| D | D1 | 10 | 10 | 10 | 10 | 10 | 10 | 10 | 10 | 10 | 10 | 10 | 10 | 10 | 10 |
| Viscosity at 60° C. (mPa·S) | | 12 | 10 | 12 | 13 | 11 | 12 | 15 | 14 | 14 | 14 | 13 | 11 | 10 | 13 |
| Light amount required for curing (mJ/cm$^2$) | | 200 | 200 | 200 | 200 | 200 | 200 | 200 | 200 | 200 | 200 | 200 | 200 | 200 | 200 |
| Appearance of cured film | | Cl | Cl | Cl | Cl | Cl | Cl | Cl | Cl | Cl | Cl | Cl | Cl | Cl | Cl |
| Appearance of uncured film | | Wh | Wh | Wh | Wh | Wh | Wh | Wh | Wh | Wh | Wh | Wh | Wh | Wh | Wh |

Cl: Clear
Wh: White (Cloudy)

TABLE 2

| | | Examples | | | | | | | | | | | | | |
|---|---|---|---|---|---|---|---|---|---|---|---|---|---|---|---|
| | | 15 | 16 | 17 | 18 | 19 | 20 | 21 | 22 | 23 | 24 | 25 | 26 | 27 | 28 |
| A | A1 | | | 5 | | | | | | | | | | | |
| | A2 | | 5 | | | | | | | | | | | | |
| | A3 | | | | 5 | | | | | | | | | | |
| | A4 | | | | | 5 | | | | | | | | | |
| | A5 | 100 | 95 | 95 | 95 | 95 | 95 | 95 | 95 | 95 | 95 | 95 | 95 | 95 | 95 |
| | A6 | | | | | | 5 | | | | | | | | |
| | A7 | | | | | | | 5 | | | | | | | |

TABLE 2-continued

|  |  | Examples | | | | | | | | | | | | | |
|---|---|---|---|---|---|---|---|---|---|---|---|---|---|---|
|  |  | 15 | 16 | 17 | 18 | 19 | 20 | 21 | 22 | 23 | 24 | 25 | 26 | 27 | 28 |
|  | A8 |  |  |  |  |  |  |  | 5 |  |  |  |  |  |  |
|  | A9 |  |  |  |  |  |  |  |  | 5 |  |  |  |  |  |
|  | A10 |  |  |  |  |  |  |  |  |  | 5 |  |  |  |  |
|  | A11 |  |  |  |  |  |  |  |  |  |  | 5 |  |  |  |
|  | A12 |  |  |  |  |  |  |  |  |  |  |  | 5 |  |  |
|  | A13 |  |  |  |  |  |  |  |  |  |  |  |  | 5 |  |
|  | A14 |  |  |  |  |  |  |  |  |  |  |  |  |  | 5 |
| B | B1 | 15 | 15 | 15 | 15 | 15 | 15 | 15 | 15 | 15 | 15 | 15 | 15 | 15 | 15 |
| C | C1 | 10 | 10 | 10 | 10 | 10 | 10 | 10 | 10 | 10 | 10 | 10 | 10 | 10 | 10 |
| D | D1 | 10 | 10 | 10 | 10 | 10 | 10 | 10 | 10 | 10 | 10 | 10 | 10 | 10 | 10 |
| Viscosity at 60° C. (mPa · S) |  | 12 | 10 | 12 | 13 | 11 | 12 | 15 | 14 | 14 | 14 | 13 | 11 | 10 | 13 |
| Light amount required for curing (mJ/Cm$^2$) |  | 200 | 200 | 200 | 200 | 200 | 200 | 200 | 200 | 200 | 200 | 200 | 200 | 200 | 200 |
| Appearance of cured film |  | Cl | Cl | Cl | Cl | Cl | Cl | Cl | Cl | Cl | Cl | Cl | Cl | Cl | Cl |
| Appearance of uncured film |  | Wh | Wh | Wh | Wh | Wh | Wh | Wh | Wh | Wh | Wh | Wh | Wh | Wh | Wh |

Cl: Clear
Wh: White (Cloudy)

TABLE 3

|  |  | Examples | | | | | | | | | | | | | |
|---|---|---|---|---|---|---|---|---|---|---|---|---|---|---|
|  |  | 29 | 30 | 31 | 32 | 33 | 34 | 35 | 36 | 37 | 38 | 39 | 40 | 41 | 42 |
| A | A1 |  | 5 |  |  |  |  |  |  |  |  |  |  |  |  |
|  | A2 |  |  | 5 |  |  |  |  |  |  |  |  |  |  |  |
|  | A3 |  |  |  | 5 |  |  |  |  |  |  |  |  |  |  |
|  | A4 |  |  |  |  | 5 |  |  |  |  |  |  |  |  |  |
|  | A5 | 100 | 95 | 95 | 95 | 95 | 95 | 95 | 95 | 95 | 95 | 95 | 95 | 95 | 95 |
|  | A6 |  |  |  |  |  | 5 |  |  |  |  |  |  |  |  |
|  | A7 |  |  |  |  |  |  | 5 |  |  |  |  |  |  |  |
|  | A8 |  |  |  |  |  |  |  | 5 |  |  |  |  |  |  |
|  | A9 |  |  |  |  |  |  |  |  | 5 |  |  |  |  |  |
|  | A10 |  |  |  |  |  |  |  |  |  | 5 |  |  |  |  |
|  | A11 |  |  |  |  |  |  |  |  |  |  | 5 |  |  |  |
|  | A12 |  |  |  |  |  |  |  |  |  |  |  | 5 |  |  |
|  | A13 |  |  |  |  |  |  |  |  |  |  |  |  | 5 |  |
|  | A14 |  |  |  |  |  |  |  |  |  |  |  |  |  | 5 |
| B | B1 | 15 | 15 | 15 | 15 | 15 | 15 | 15 | 15 | 15 | 15 | 15 | 15 | 15 | 15 |
| C | C1 | 10 | 10 | 10 | 10 | 10 | 10 | 10 | 10 | 10 | 10 | 10 | 10 | 10 | 10 |
| D | D1 | 10 | 10 | 10 | 10 | 10 | 10 | 10 | 10 | 10 | 10 | 10 | 10 | 10 | 10 |
| Viscosity at 60° C. (mPa · S) |  | 11 | 10 | 11 | 12 | 10 | 11 | 14 | 13 | 13 | 13 | 12 | 10 | 10 | 12 |
| Light amount required for curing (mJ/cm$^2$) |  | 500 | 500 | 500 | 500 | 500 | 500 | 500 | 500 | 500 | 500 | 500 | 500 | 500 | 500 |
| Appearance of cured film |  | Cl | Cl | Cl | Cl | Cl | Cl | Cl | Cl | Cl | Cl | Cl | Cl | Cl | Cl |
| Appearance of uncured film |  | Wh | Wh | Wh | Wh | Wh | Wh | Wh | Wh | Wh | Wh | Wh | Wh | Wh | Wh |

Cl: Clear
Wh: White (Cloudy)

TABLE 4

|  |  | Examples | | | | | | | | | | | | | |
|---|---|---|---|---|---|---|---|---|---|---|---|---|---|---|
|  |  | 43 | 44 | 45 | 46 | 47 | 48 | 49 | 50 | 51 | 52 | 53 | 54 | 55 | 56 |
| A | A1 |  | 5 |  |  |  |  |  |  |  |  |  |  |  |  |
|  | A2 |  |  | 5 |  |  |  |  |  |  |  |  |  |  |  |
|  | A3 |  |  |  | 5 |  |  |  |  |  |  |  |  |  |  |
|  | A4 |  |  |  |  | 5 |  |  |  |  |  |  |  |  |  |
|  | A5 | 100 | 95 | 95 | 95 | 95 | 95 | 95 | 95 | 95 | 95 | 95 | 95 | 95 | 95 |
|  | A6 |  |  |  |  |  | 5 |  |  |  |  |  |  |  |  |

TABLE 4-continued

|  |  | Examples | | | | | | | | | | | | | |
|---|---|---|---|---|---|---|---|---|---|---|---|---|---|---|
|  |  | 43 | 44 | 45 | 46 | 47 | 48 | 49 | 50 | 51 | 52 | 53 | 54 | 55 | 56 |
|  | A7 |  |  |  |  |  |  | 5 |  |  |  |  |  |  |  |
|  | A8 |  |  |  |  |  |  |  | 5 |  |  |  |  |  |  |
|  | A9 |  |  |  |  |  |  |  |  | 5 |  |  |  |  |  |
|  | A10 |  |  |  |  |  |  |  |  |  | 5 |  |  |  |  |
|  | A11 |  |  |  |  |  |  |  |  |  |  | 5 |  |  |  |
|  | A12 |  |  |  |  |  |  |  |  |  |  |  | 5 |  |  |
|  | A13 |  |  |  |  |  |  |  |  |  |  |  |  | 5 |  |
|  | A14 |  |  |  |  |  |  |  |  |  |  |  |  |  | 5 |
| B | B1 | 15 | 15 | 15 | 15 | 15 | 15 | 15 | 15 | 15 | 15 | 15 | 15 | 15 | 15 |
| C | C1 | 10 | 10 | 10 | 10 | 10 | 10 | 10 | 10 | 10 | 10 | 10 | 10 | 10 | 10 |
| D | D1 | 10 | 10 | 10 | 10 | 10 | 10 | 10 | 10 | 10 | 10 | 10 | 10 | 10 | 10 |
| Viscosity at 60° C. (mPa·S) | | 11 | 10 | 11 | 12 | 10 | 11 | 14 | 13 | 13 | 13 | 12 | 10 | 10 | 12 |
| Light amount required for curing (mJ/cm$^2$) | | 500 | 500 | 500 | 500 | 500 | 500 | 500 | 500 | 500 | 500 | 500 | 500 | 500 | 500 |
| Appearance of cured film | | Cl | Cl | Cl | Cl | Cl | Cl | Cl | Cl | Cl | Cl | Cl | Cl | Cl | Cl |
| Appearance of uncured film | | Wh | Wh | Wh | Wh | Wh | Wh | Wh | Wh | Wh | Wh | Wh | Wh | Wh | Wh |

Cl: Clear
Wh: White (Cloudy)

TABLE 5

|  |  | Comparative Examples | | | | | | | | | | | | | |
|---|---|---|---|---|---|---|---|---|---|---|---|---|---|---|
|  |  | 1 | 2 | 3 | 4 | 5 | 6 | 7 | 8 | 9 | 10 | 11 | 12 | 13 | 14 |
| A | A1 |  | 5 |  |  |  |  |  |  |  |  |  |  |  |  |
|  | A2 |  |  | 5 |  |  |  |  |  |  |  |  |  |  |  |
|  | A3 |  |  |  | 5 |  |  |  |  |  |  |  |  |  |  |
|  | A4 |  |  |  |  | 5 |  |  |  |  |  |  |  |  |  |
|  | A5 | 100 | 95 | 95 | 95 | 95 | 95 | 95 | 95 | 95 | 95 | 95 | 95 | 95 | 95 |
|  | A6 |  |  |  |  |  | 5 |  |  |  |  |  |  |  |  |
|  | A7 |  |  |  |  |  |  | 5 |  |  |  |  |  |  |  |
|  | A8 |  |  |  |  |  |  |  | 5 |  |  |  |  |  |  |
|  | A9 |  |  |  |  |  |  |  |  | 5 |  |  |  |  |  |
|  | A10 |  |  |  |  |  |  |  |  |  | 5 |  |  |  |  |
|  | A11 |  |  |  |  |  |  |  |  |  |  | 5 |  |  |  |
|  | A12 |  |  |  |  |  |  |  |  |  |  |  | 5 |  |  |
|  | A13 |  |  |  |  |  |  |  |  |  |  |  |  | 5 |  |
|  | A14 |  |  |  |  |  |  |  |  |  |  |  |  |  | 5 |
| B | B1 | 15 | 15 | 15 | 15 | 15 | 15 | 15 | 15 | 15 | 15 | 15 | 15 | 15 | 15 |
| Viscosity at 60° C. (mPa·S) | | 13 | 11 | 13 | 14 | 12 | 13 | 16 | 15 | 15 | 15 | 14 | 12 | 11 | 14 |
| Light amount required for curing (mJ/cm2) | | * | * | * | * | * | * | * | * | * | * | * | * | * | * |
| Appearance of cured film | | Cl | Cl | Cl | Cl | Cl | Cl | Cl | Cl | Cl | Cl | Cl | Cl | Cl | Cl |
| Appearance of uncured film | | Cl | Cl | Cl | Cl | Cl | Cl | Cl | Cl | Cl | Cl | Cl | Cl | Cl | Cl |

* Light amount required for curing (mJ/cm$^2$): 5,000
Cl: Clear

TABLE 6

|  |  | Comparative Examples | | | | | | | | | | | | | |
|---|---|---|---|---|---|---|---|---|---|---|---|---|---|---|
|  |  | 15 | 16 | 17 | 18 | 19 | 20 | 21 | 22 | 23 | 24 | 25 | 26 | 27 | 28 |
| A | A1 |  | 5 |  |  |  |  |  |  |  |  |  |  |  |  |
|  | A2 |  |  | 5 |  |  |  |  |  |  |  |  |  |  |  |
|  | A3 |  |  |  | 5 |  |  |  |  |  |  |  |  |  |  |
|  | A4 |  |  |  |  | 5 |  |  |  |  |  |  |  |  |  |
|  | A5 | 100 | 95 | 95 | 95 | 95 | 95 | 95 | 95 | 95 | 95 | 95 | 95 | 95 | 95 |
|  | A6 |  |  |  |  |  | 5 |  |  |  |  |  |  |  |  |
|  | A7 |  |  |  |  |  |  | 5 |  |  |  |  |  |  |  |

TABLE 6-continued

|  |  | Comparative Examples |  |  |  |  |  |  |  |  |  |  |  |  |  |
|---|---|---|---|---|---|---|---|---|---|---|---|---|---|---|
|  |  | 15 | 16 | 17 | 18 | 19 | 20 | 21 | 22 | 23 | 24 | 25 | 26 | 27 | 28 |
|  | A8 |  |  |  |  |  |  |  | 5 |  |  |  |  |  |  |
|  | A9 |  |  |  |  |  |  |  |  | 5 |  |  |  |  |  |
|  | A10 |  |  |  |  |  |  |  |  |  | 5 |  |  |  |  |
|  | A11 |  |  |  |  |  |  |  |  |  |  | 5 |  |  |  |
|  | A12 |  |  |  |  |  |  |  |  |  |  |  | 5 |  |  |
|  | A13 |  |  |  |  |  |  |  |  |  |  |  |  | 5 |  |
|  | A14 |  |  |  |  |  |  |  |  |  |  |  |  |  | 5 |
| B | B2 | 15 | 15 | 15 | 15 | 15 | 15 | 15 | 15 | 15 | 15 | 15 | 15 | 15 | 15 |
| Viscosity at 60° C. (mPa·S) |  | 12 | 10 | 12 | 13 | 11 | 12 | 15 | 14 | 14 | 14 | 13 | 11 | 10 | 13 |
| Light amount required for curing (mJ/cm$^2$) |  | UC | UC | UC | UC | UC | UC | UC | UC | UC | UC | UC | UC | UC | UC |
| Appearance of cured film |  | NE | NE | NE | NE | NE | NE | NE | NE | NE | NE | NE | NE | NE | NE |
| Appearance of uncured film |  | Cl | Cl | Cl | Cl | Cl | Cl | Cl | Cl | Cl | Cl | Cl | Cl | Cl | Cl |

UC: Uncured
NE: Not evaluated
Cl: Clear

TABLE 7

|  |  | Comparative Examples |  |  |  |  |  |  |  |  |  |  |  |  |  |
|---|---|---|---|---|---|---|---|---|---|---|---|---|---|---|---|
|  |  | 29 | 30 | 31 | 32 | 33 | 34 | 35 | 36 | 37 | 38 | 39 | 40 | 41 | 42 |
| A | A1 |  | 5 |  |  |  |  |  |  |  |  |  |  |  |  |
|  | A2 |  |  | 5 |  |  |  |  |  |  |  |  |  |  |  |
|  | A3 |  |  |  | 5 |  |  |  |  |  |  |  |  |  |  |
|  | A4 |  |  |  |  | 5 |  |  |  |  |  |  |  |  |  |
|  | A5 | 100 | 95 | 95 | 95 | 95 | 95 | 95 | 95 | 95 | 95 | 95 | 95 | 95 | 95 |
|  | A6 |  |  |  |  |  | 5 |  |  |  |  |  |  |  |  |
|  | A7 |  |  |  |  |  |  | 5 |  |  |  |  |  |  |  |
|  | A8 |  |  |  |  |  |  |  | 5 |  |  |  |  |  |  |
|  | A9 |  |  |  |  |  |  |  |  | 5 |  |  |  |  |  |
|  | A10 |  |  |  |  |  |  |  |  |  | 5 |  |  |  |  |
|  | A11 |  |  |  |  |  |  |  |  |  |  | 5 |  |  |  |
|  | A12 |  |  |  |  |  |  |  |  |  |  |  | 5 |  |  |
|  | A13 |  |  |  |  |  |  |  |  |  |  |  |  | 5 |  |
|  | A14 |  |  |  |  |  |  |  |  |  |  |  |  |  | 5 |
| C | C1 | 10 | 10 | 10 | 10 | 10 | 10 | 10 | 10 | 10 | 10 | 10 | 10 | 10 | 10 |
| D | D1 | 10 | 10 | 10 | 10 | 10 | 10 | 10 | 10 | 10 | 10 | 10 | 10 | 10 | 10 |
| Viscosity at 60° C. (mPa·S) |  | 8 | 7 | 8 | 9 | 7 | 8 | 11 | 10 | 10 | 10 | 9 | 8 | 7 | 9 |
| Light amount required for curing (mJ/cm$^2$) |  | * | * | * | * | * | * | * | * | * | * | * | * | * | * |
| Appearance of cured film |  | Cl | Cl | Cl | Cl | Cl | Cl | Cl | Cl | Cl | Cl | Cl | Cl | Cl | Cl |
| Appearance of uncured film |  | Wh | Wh | Wh | Wh | Wh | Wh | Wh | Wh | Wh | Wh | Wh | Wh | Wh | Wh |

Cl: Clear
* Light amount required for curing (mJ/cm$^2$): 1,000
Wh: White (Cloudy)

TABLE 8

|  |  | Comparative Examples |  |  |  |  |  |  |  |  |  |  |  |  |  |
|---|---|---|---|---|---|---|---|---|---|---|---|---|---|---|---|
|  |  | 43 | 44 | 45 | 46 | 47 | 48 | 49 | 50 | 51 | 52 | 53 | 54 | 55 | 56 |
| A | A1 |  | 5 |  |  |  |  |  |  |  |  |  |  |  |  |
|  | A2 |  |  | 5 |  |  |  |  |  |  |  |  |  |  |  |
|  | A3 |  |  |  | 5 |  |  |  |  |  |  |  |  |  |  |
|  | A4 |  |  |  |  | 5 |  |  |  |  |  |  |  |  |  |
|  | A5 | 100 | 95 | 95 | 95 | 95 | 95 | 95 | 95 | 95 | 95 | 95 | 95 | 95 | 95 |
|  | A6 |  |  |  |  |  | 5 |  |  |  |  |  |  |  |  |
|  | A7 |  |  |  |  |  |  | 5 |  |  |  |  |  |  |  |

TABLE 8-continued

|  |  | Comparative Examples |  |  |  |  |  |  |  |  |  |  |  |  |  |
|---|---|---|---|---|---|---|---|---|---|---|---|---|---|---|---|
|  |  | 43 | 44 | 45 | 46 | 47 | 48 | 49 | 50 | 51 | 52 | 53 | 54 | 55 | 56 |
|  | A8 |  |  |  |  |  |  |  | 5 |  |  |  |  |  |  |
|  | A9 |  |  |  |  |  |  |  |  | 5 |  |  |  |  |  |
|  | A10 |  |  |  |  |  |  |  |  |  | 5 |  |  |  |  |
|  | A11 |  |  |  |  |  |  |  |  |  |  | 5 |  |  |  |
|  | A12 |  |  |  |  |  |  |  |  |  |  |  | 5 |  |  |
|  | A13 |  |  |  |  |  |  |  |  |  |  |  |  | 5 |  |
|  | A14 |  |  |  |  |  |  |  |  |  |  |  |  |  | 5 |
| C | C2 | 10 | 10 | 10 | 10 | 10 | 10 | 10 | 10 | 10 | 10 | 10 | 10 | 10 | 10 |
| D | D1 | 10 | 10 | 10 | 10 | 10 | 10 | 10 | 10 | 10 | 10 | 10 | 10 | 10 | 10 |
| Viscosity at 60° C. (mPa · S) |  | 8 | 7 | 8 | 9 | 7 | 8 | 11 | 10 | 10 | 10 | 9 | 8 | 7 | 9 |
| Light amount required for curing (mJ/Cm$^2$) |  | 500 | 500 | 500 | 500 | 500 | 500 | 500 | 500 | 500 | 500 | 500 | 500 | 500 | 500 |
| Appearance of cured film |  | Cl | Cl | Cl | Cl | Cl | Cl | Cl | Cl | Cl | Cl | Cl | Cl | Cl | Cl |
| Appearance of uncured film |  | Wh | Wh | Wh | Wh | Wh | Wh | Wh | Wh | Wh | Wh | Wh | Wh | Wh | Wh |

Cl: Clear
Wh: White (Cloudy)

As seen in the results shown in Tables 1 to 8, more amounts of light are required for Comparative Examples 1 to 14 in which only the molecule cleavage type optical polymerization initiator is used and Comparative Examples 29 to 56 in which only the hydrogen-extracting type optical polymerization initiator is used than those in Examples. In addition, the films are not cured in Comparative Examples 15 to 28 in which only the molecule cleavage type optical polymerization initiators other than in Comparative Examples 1 to 14 are used.

Furthermore, in Comparative Examples 1 to 14, the appearances of the cured films and the uncured films are transparent, which are not distinguishable from each other.

By contrast, in Examples in which both the molecule cleavage type optical polymerization initiator and the hydrogen-extracting type optical polymerization initiator are used in combination, the amount of light required for curing significantly decreases in comparison with Comparative Examples and the curability is improved.

Moreover, since the appearance of the uncured film is opaque while the appearance of the cured film is transparent, the cured state is easily determined by the naked eye.

What is claimed is:

1. An optically polymerizable inkjet ink comprising:
   an optically polymerizable monomer having a Stimulation Index (SI) of less than 3 in a skin sensitization test as measured by Local Lymph Node Assay (LLNA);
   a molecule cleavage type optical polymerization initiator;
   a hydrogen-extracting type optical polymerization initiator; and
   an amine compound serving as a polymerization accelerator,
   wherein the amine compound is an ester compound of salicylic acid having an N,N-dimethyl amino group.

2. The optically polymerizable inkjet ink according to claim 1, wherein the hydrogen-extracting type optical polymerization initiator is a thioxanthone compound.

3. The optically polymerizable inkjet ink according to claim 1, wherein the optically polymerizable monomer is one of a polyethylene glycol dimethacrylate represented by Chemical formula 1 below, γ-butyrolactone methacrylate, trimethylol propane trimethacrylate, tricyclodecane dimethanol dimethacrylate, caprolactone-modified dipentaerythritol hexaacrylate, a polypropylene glycol diacrylate $(CH_2=CH-CO-(OC_3H_6)n\text{-}OCOCH=CH2(n\approx1.2))$, caprolactone-modified hydroxy pivalic acid neopentyl glycol diacrylate, a polyethoxilated tetramethylol methane tetraacrylate, ethylene oxide-modified bisphenol A diacrylate, neopentyl glycol dimethacrylate, stearyl acrylate, 1,4-butane diol dimethacrylate, or hydroxyethyl acrylamide:

Chemical formula 1

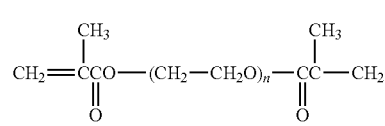

where n is an integer of from 9 to 14.

4. An ink cartridge comprising:
   a collapsible, air-tight bag to accommodate the optically polymerizable inkjet ink of claim 1; and
   a cartridge case containing the bag.

5. The ink cartridge according to claim 4, wherein the bag is made of aluminum laminate film.

6. The ink cartridge according to claim 4, wherein the bag is made of resin film.

7. A printer comprising:
   a printing unit; and
   the ink cartridge of claim 4.

* * * * *